United States Patent [19]
Foltz

[11] 3,708,827
[45] Jan. 9, 1973

[54] PANEL-SUPPORTING CARRIAGE

[75] Inventor: Robert E. Foltz, Sterling, Ill.

[73] Assignee: Lawrence Brothers, Inc., Sterling, Ill.

[22] Filed: April 9, 1970

[21] Appl. No.: 27,061

[52] U.S. Cl. ..........................16/98, 308/240, 16/107
[51] Int. Cl..........................A47h 15/00, B65d 25/28
[58] Field of Search....16/45, 46, 47, 97, 98, 99–107; 308/238, 240

[56] References Cited

UNITED STATES PATENTS

| | | | |
|---|---|---|---|
| 632,166 | 8/1899 | Berninghaus et al. | 16/47 |
| 2,234,481 | 3/1941 | Shafer | 16/107 X |
| 2,688,960 | 9/1954 | Fischer et al. | 16/47 |
| 3,155,051 | 11/1964 | Sherburne | 16/102 X |
| 3,193,870 | 7/1965 | McNinch | 16/97 |
| 3,220,786 | 11/1965 | McCutchen | 308/240 |
| 3,107,947 | 10/1963 | Hulterstrum | 16/105 X |

FOREIGN PATENTS OR APPLICATIONS 1,345,005  10/1963  France ....................16/107

*Primary Examiner*—Bobby R. Gay
*Assistant Examiner*—Peter A. Aschenbrenner
*Attorney*—Olson, Trexler, Wolters & Bushnell

[57] ABSTRACT

The present invention relates generally to improvements in the structure of door panel supporting carriages, and more particularly to the roller securing section of such carriages. The embodiment of the invention disclosed herein includes a carriage frame having oppositely disposed pintles extending therefrom and rollers carried by said pintles, the outer extremities of each pintle being slightly enlarged. The roller associated with each pintle has a central aperture the diameter of which is slightly less than the outer diameter of the pintle enlargement, said rollers being sufficiently yieldable to permit telescopic assembly thereof with a complementary pintle.

5 Claims, 6 Drawing Figures

PATENTED JAN 9 1973  3,708,827

Inventor
Robert E. Foltz
By: Olson, Trexler, Wolters & Bushnell Attys

PANEL-SUPPORTING CARRIAGE

It is an object of the present invention to provide improved, effective means for preventing unintentional or unauthorized axial displacement of carriage rollers from the pintles with which they are associated.

More specifically, the present invention contemplates a panel supporting carriage of the type referred to above, wherein the means for securing each roller against dislodgement from its companion pintle is structurally very simple, yet highly efficient.

It is also an object of the present invention to provide a roller equipped carriage arrangement as set forth above wherein the rollers may be of the non-metallic, plastic type having in association therewith, a self-lubricating bearing sleeve, such as an oil impregnated bearing member.

The foregoing and other objects and advantages will be more apparent from the following detailed description when considered in connection with the accompanying drawing wherein.

Figure 1:
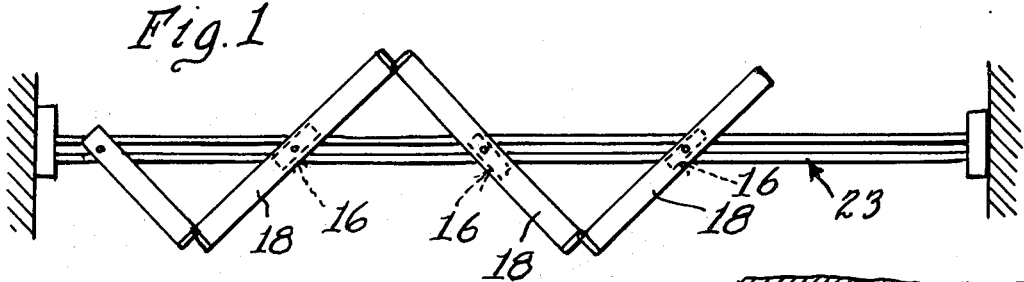
FIG. 1 is a view of the underside of a conventional guide track and a plurality of door panels of the type having a panel supporting carriage associated with the upper margin of each panel.
Figure 2:
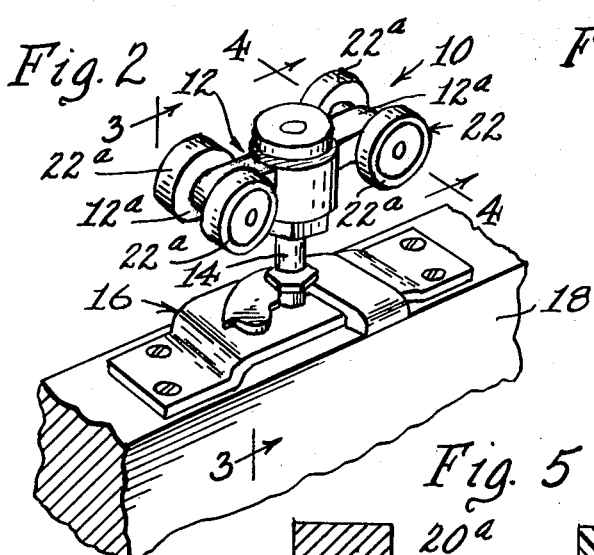
FIG. 2 is a perspective view of a panel supporting carriage of the type contemplated hereby.
Figure 3:
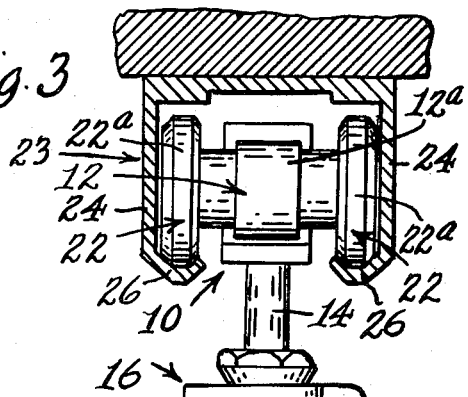
FIG. 3 is an enlarged transverse sectional view taken substantially along the line 3—3 of FIG. 2, with the carriage shown in operative association with a complementary overhead guide track.

Referring now to the drawing more in detail wherein like numerals have been employed to designate similar parts throughout the various figures, it will be seen that one embodiment of the present invention is incorporated in a panel supporting carriage designated generally by the numeral 10. The carriage 10 includes a frame 12 which supports a depending pin 14. The lower extremity of the pin 14, is detachably connected with a latch mechanism designated generally by the numeral 16, which is attached to the upper margin of a door panel 18. In this regard, the door 18 may be part of an accordion door assembly, as illustrated, or a straight sliding arrangement.

Figure 5:
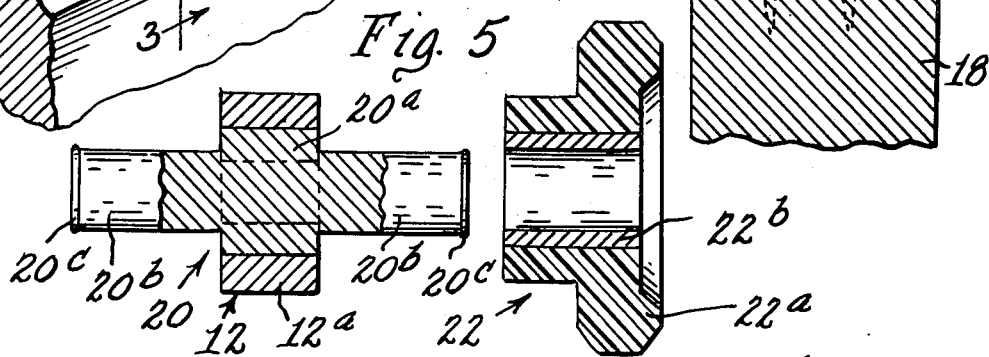
FIG. 5 is an exploded, sectional view similar to FIG. 4, showing one of the rollers about to be telescopically assembled with a complementary pintle; and, FIG. 6 is a fragmentary vertical sectional view taken substantially along the line 6—6 of FIG. 5.
Figure 4:
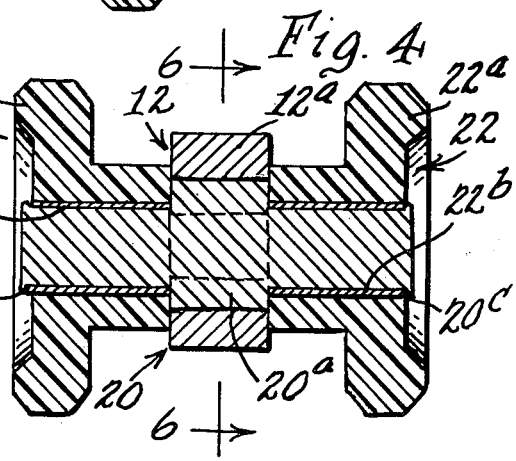
FIG. 4 is an enlarged fragmentary sectional view taken substantially along the line 4—4 of FIG. 2.
Figure 6:
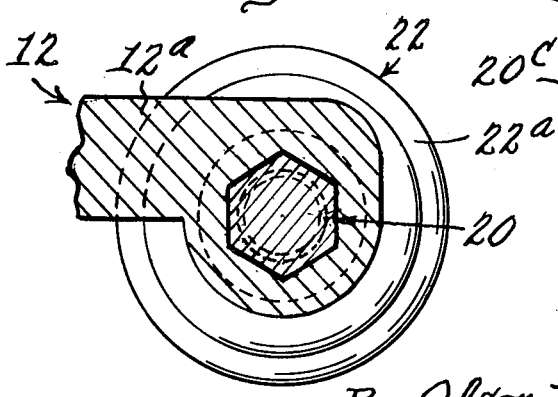

The carriage frame 12 includes a pair of oppositely disposed arms 12a which carry a pintle or axle structure 20. As shown in FIG. 5, each pintle structure 20 includes a central enlarged section 20a secured against rotation within a complementary aperture formed in an extremity of arm 12a. Extending outwardly from opposite sides of the enlarged pintle section 20a are pintle shanks 20b. If desired, only one arm 12a and pintle structure 20 assembly may be employed.

Rotatably mounted on each pintle shank 20b is a roller assembly designated generally by the numeral 22. Each roller assembly 22 includes a roller member 22a and a self-lubricating sleeve or oil impregnated member 22b which is rotatable as a unit with the roller member 22a. It has been found practical to produce the rollers 22a of suitable self-lubricating plastic material such as nylon, or the like. The bearing sleeves 22b may be produced from Oilite material or any other suitable oil impregnated stock. It is important also that both the sleeve 22b and the roller member 22a to which it is secured, be radially expandable so as to permit telescopic association of the roller assembly 22 with its complementary pintle shank 20b as the assembly is moved into telescopic association with a slightly enlarged extremity of shoulder 20c of the pintle shank 20b, FIG. 5. In FIG. 5, the thickness of the bearing sleeve stock is purposely enlarged to present a clearer illustration of the associated parts.

Upon complete telescopic association of the roller assembly 22 with its complementary pintle shank 20b, the inner diameter of the roller assembly will spring back to its normal size which is smaller than the diameter of the shoulder 20c. Obviously, after the carriage 10 is mounted within an overhead track 23, comprising walls 24 and flanges 26, the inner surfaces of the track walls will prevent any possible axial dislodgement of the roller assemblies 22. However, the frictional resistance offered by the enlarged pintle shank extremities 20c is sufficient to prevent unintentional axial separation of the roller assemblies prior to the assembly of the carriage with the overhead track.

For the purpose of illustrating one practical embodiment of the assembled pintle shank and roller, the roller assembly 22 is disclosed as comprising two parts; namely: the roller member 22a, and the self-lubricating sleeve 22b, rotatable therewith. The present invention also contemplates a structure wherein the sleeves 22b may be eliminated and the rollers 22a mounted directly upon the periphery of the pintle shanks 20b. These rollers, because of their inherent firm yieldable characteristics, may be sprung over the enlarged shank extremities or shoulders 20c, as previously described.

The above described type of roller and pintle shank assembly not only facilitates assembly of the plastic rollers with the pintle shanks, but also makes possible, the removal of a roller from its complementary pintle by exerting pressure axially outwardly. The present invention avoids the necessity of employing auxiliary roller securing devices. By the simple expedient of a shank enlargement and yieldable rollers, a great savings in cost of production is assured. Also the speed and ease with which the telescopic assembly of the rollers and pintles are materially facilitated. It will also be noted that the outer sides of each pair of rollers are axially recessed and the pintle shank enlarged extremities are positioned within said recesses. This arrangement prevents metal to metal contact between the shank extremities and the inner surfaces of the track walls.

I claim:

1. A panel supporting carriage of the type adapted to be shifted along an overhead track having spaced sidewalls and roller-supporting flanges extending from the lower margin thereof, said carriage including frame means, roller accommodating pintle shanks extending outwardly from opposite sides of said frame means, a centrally apertured plastic guide roller, and associated oil impregnated relatively thin expandable metal sleeve forcibly telescoped with and rotatably supported by each pintle, the space defined by the outer sides of a pair of said rotatably supported rollers and sleeves approximating the space between the inner surfaces of the sidewalls of a complementary overhead track, and an integral slight enlargement at the extremity of each pintle shank of greater diameter than the inner diameter of said sleeves providing a shoulder to prevent unintentional axial dislodgment of an associated roller and sleeve, the oil impregnated material of said sleeves and the material of said rollers along the length of said sleeves being sufficiently yieldable radially to permit forced telescopic association thereof over an associated shoulder with resilient spring back of the material of both the sleeves and rollers to normal size with the respective sleeves in engagement with the pintle shanks.

2. A panel supporting carriage as set forth in claim 1, wherein the outer sides of each pair of rollers are axially recessed, and the pintle shank enlargements are positioned in said recesses and within the planes coincident with the outer sides of said rollers.

3. A panel supporting carriage as set forth in claim 1, wherein said frame means include at least one apertured arm, and said pintle shanks are provided by a pintle structure non-rotatably mounted in said aperture.

4. A panel supporting carriage as set forth in claim 3, wherein said frame means include a pair of oppositely extending apertured arms, each said arm having a pintle structure mounted thereto to provide two pair of pintle shanks with one said guide roller supported on each shank.

5. A panel supporting carriage as set forth in claim 1, wherein the roller comprises an assembly including a bearing sleeve rotatable upon said pintle shank and a roller body encircling said sleeve, said sleeve being fabricated from Oilite material thus rendering it self-lubricating.

* * * * *